United States Patent
Kochura et al.

(10) Patent No.: US 12,229,708 B2
(45) Date of Patent: Feb. 18, 2025

(54) DYNAMIC DISPLAY OF STACKED ITEMS IN A DELIVERY VEHICLE BASED ON A DELIVERY ROUTE CHANGE

(71) Applicant: INTERNATIONAL BUSINESS MACHINES CORPORATION, Armonk, NY (US)

(72) Inventors: Nadiya Kochura, Bolton, MA (US); Tiberiu Suto, Franklin, NY (US); Hemant Kumar Sivaswamy, Pune (IN); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/102,100

(22) Filed: Jan. 27, 2023

(65) Prior Publication Data

US 2024/0257032 A1    Aug. 1, 2024

(51) Int. Cl.
*G06Q 10/083*  (2024.01)
(52) U.S. Cl.
CPC .................. *G06Q 10/083* (2013.01)
(58) Field of Classification Search
CPC ...................................... G06Q 50/40
USPC ........................................ 705/330
See application file for complete search history.

(56) References Cited

U.S. PATENT DOCUMENTS

| | | | |
|---|---|---|---|
| 9,488,488 B2 | 11/2016 | Waldman | |
| 11,615,370 B1 * | 3/2023 | Li | G06Q 10/08355 |
| | | | 705/338 |
| 2002/0067372 A1 | 6/2002 | Friedrich | |
| 2013/0249943 A1 * | 9/2013 | Chen | G09G 5/00 |
| | | | 345/633 |

(Continued)

FOREIGN PATENT DOCUMENTS

| | | | | |
|---|---|---|---|---|
| CA | 3066261 A1 * | 6/2020 | | B60P 1/00 |
| WO | 2016077506 A1 | 5/2016 | | |

OTHER PUBLICATIONS

M. Ratnagiri, C. O'Dwyer, L. E. Beaver, H. Bang, B. Chalaki and A. A. Malikopoulos, "A Scalable Last-Mile Delivery Service: From Simulation to Scaled Experiment," 2022 IEEE 25th International Conference on Intelligent Transportation Systems (ITSC), Macau, China, 2022, pp. 4163-4168. (Year: 2022).*

(Continued)

*Primary Examiner* — Jeff Zimmerman
*Assistant Examiner* — Hunter A Molnar
(74) *Attorney, Agent, or Firm* — Jordan T. Schiller (57) ABSTRACT

A method for dynamically rearranging one or more packages for delivery on a delivery vehicle in response to unforeseen changes in a pre-planned delivery route. The method detects, via one or more sensor-enabled shelves in a delivery vehicle, an address and package details of a respective delivery package. The method further integrates the one or more sensor-enabled shelves with a route map that depicts the pre-planned delivery route. The method further assigns new values to the one or more sensor-enabled shelves, in (Continued)

response to a change in the pre-planned delivery route, indicating a new sequence of delivery for each respective delivery package. The method further notifies a delivery person which delivery package is to be delivered at a current stop by illuminating the one or more sensor-enabled shelves containing the respective delivery package.

20 Claims, 4 Drawing Sheets

(56) References Cited

U.S. PATENT DOCUMENTS

| | | |
|---|---|---|
| 2015/0210199 A1 | 7/2015 | Payne |
| 2016/0042320 A1* | 2/2016 | Dearing .................... B07C 3/00 |
| | | 705/338 |
| 2017/0140329 A1 | 5/2017 | Bernhardt |
| 2017/0200120 A1 | 7/2017 | High |
| 2018/0068266 A1* | 3/2018 | Kirmani ............... G01G 19/005 |
| 2018/0125267 A1* | 5/2018 | Jones ................... G06Q 10/087 |
| 2019/0034874 A1 | 1/2019 | Klingenberg |
| 2019/0098263 A1 | 3/2019 | Seiger |
| 2019/0152376 A1* | 5/2019 | Schwartz ............... G06Q 10/08 |
| 2019/0347612 A1 | 11/2019 | Anders |
| 2020/0074386 A1* | 3/2020 | Mossoba ................. G06F 40/10 |
| 2020/0074404 A1* | 3/2020 | Gil, Jr. ..................... B64D 1/12 |
| 2022/0027845 A1 | 1/2022 | Silverstein |

OTHER PUBLICATIONS

IBM, "IBM Sterling Order Management", 2021, 2 pages, https://www.ibm.com/downloads/cas/0M5G6R2Q.

IBM, "IBM Sterling® Order Management", accessed on Nov. 18, 2022, 7 pages, https://www.ibm.com/products/order-management.

Programmableweb, "Augmented Reality APIs", accessed on Nov. 18, 2022, 6 pages, https://www.programmableweb.com/category/augmented-reality/api.

\* cited by examiner

DYNAMIC DISPLAY OF STACKED ITEMS IN A DELIVERY VEHICLE BASED ON A DELIVERY ROUTE CHANGE

BACKGROUND

The present disclosure relates generally to the field of cognitive computing, Internet of Things (IoT), augmented reality (AR) and more particularly to data processing and dynamically rearranging delivery packages in a delivery vehicle in response to unforeseen changes in a delivery route.

Courier services deliver thousands of packages daily and millions of packages annually. A courier vehicle typically picks up the packages from a warehouse and the driver stacks packages in the vehicle based on the planned delivery route. For example, the first package to be delivered is manually placed closer to the courier vehicle's back door while the last item to be delivered is placed furthest from the back door.

Oftentimes, the planned delivery route faces unforeseen changes due to a road repair or an accident. In these circumstances, the courier driver may need to take a detour thereby altering the pre-planned delivery route. The packages that were previously stacked in the courier vehicle in a pre-planned order may now be out of order.

Currently, there is no way to dynamically arrange, or re-arrange, the delivery packages in the courier vehicle based on a route change.

BRIEF SUMMARY

Embodiments of the present invention disclose a method, a computer program product, and a system.

According to an embodiment, a method, in a data processing system including a processor and a memory, for dynamically rearranging one or more packages for delivery on a delivery vehicle in response to unforeseen changes in a pre-planned delivery route is provided. The method detects, via one or more sensor-enabled shelves in the delivery vehicle, an address and package details of a respective delivery package associated with the one or more sensor-enabled shelves. The method further integrates the one or more sensor-enabled shelves with a route map that depicts the pre-planned delivery route. In response to a change in the pre-planned delivery route, the method assigns new values to the one or more sensor-enabled shelves indicating a new sequence of delivery for each respective delivery package. The method further associates a location of the delivery vehicle with the address of the respective delivery package associated with the one or more sensor-enabled shelves and notifies a delivery person which delivery package is to be delivered at a current stop by illuminating the one or more sensor-enabled shelves containing the respective delivery package.

A computer program product, according to an embodiment of the invention, includes a non-transitory tangible storage device having program code embodied therewith. The program code is executable by a processor of a computer to perform a method. The method detects, via one or more sensor-enabled shelves in the delivery vehicle, an address and package details of a respective delivery package associated with the one or more sensor-enabled shelves. The method further integrates the one or more sensor-enabled shelves with a route map that depicts the pre-planned delivery route. In response to a change in the pre-planned delivery route, the method assigns new values to the one or more sensor-enabled shelves indicating a new sequence of delivery for each respective delivery package. The method further associates a location of the delivery vehicle with the address of the respective delivery package associated with the one or more sensor-enabled shelves and notifies a delivery person which delivery package is to be delivered at a current stop by illuminating the one or more sensor-enabled shelves containing the respective delivery package.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method detects, via one or more sensor-enabled shelves in the delivery vehicle, an address and package details of a respective delivery package associated with the one or more sensor-enabled shelves. The method further integrates the one or more sensor-enabled shelves with a route map that depicts the pre-planned delivery route. In response to a change in the pre-planned delivery route, the method assigns new values to the one or more sensor-enabled shelves indicating a new sequence of delivery for each respective delivery package. The method further associates a location of the delivery vehicle with the address of the respective delivery package associated with the one or more sensor-enabled shelves and notifies a delivery person which delivery package is to be delivered at a current stop by illuminating the one or more sensor-enabled shelves containing the respective delivery package.

DETAILED DESCRIPTION

Courier services deliver millions of packages annually. Efficiency is a critical component of a courier service.

Couriers strategically place first-to-be-delivered packages towards the back of the delivery vehicle for expediency. However, when a pre-planned delivery route is abruptly changed due to unforeseen road repairs, car accidents, or traffic, the delivery vehicle is forced to take a different route.

The present invention discloses a dynamic way of displaying the stacked delivery packages in a delivery vehicle, based on the route change, by using IoT sensor-enabled shelves in the delivery vehicle and AR glasses.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
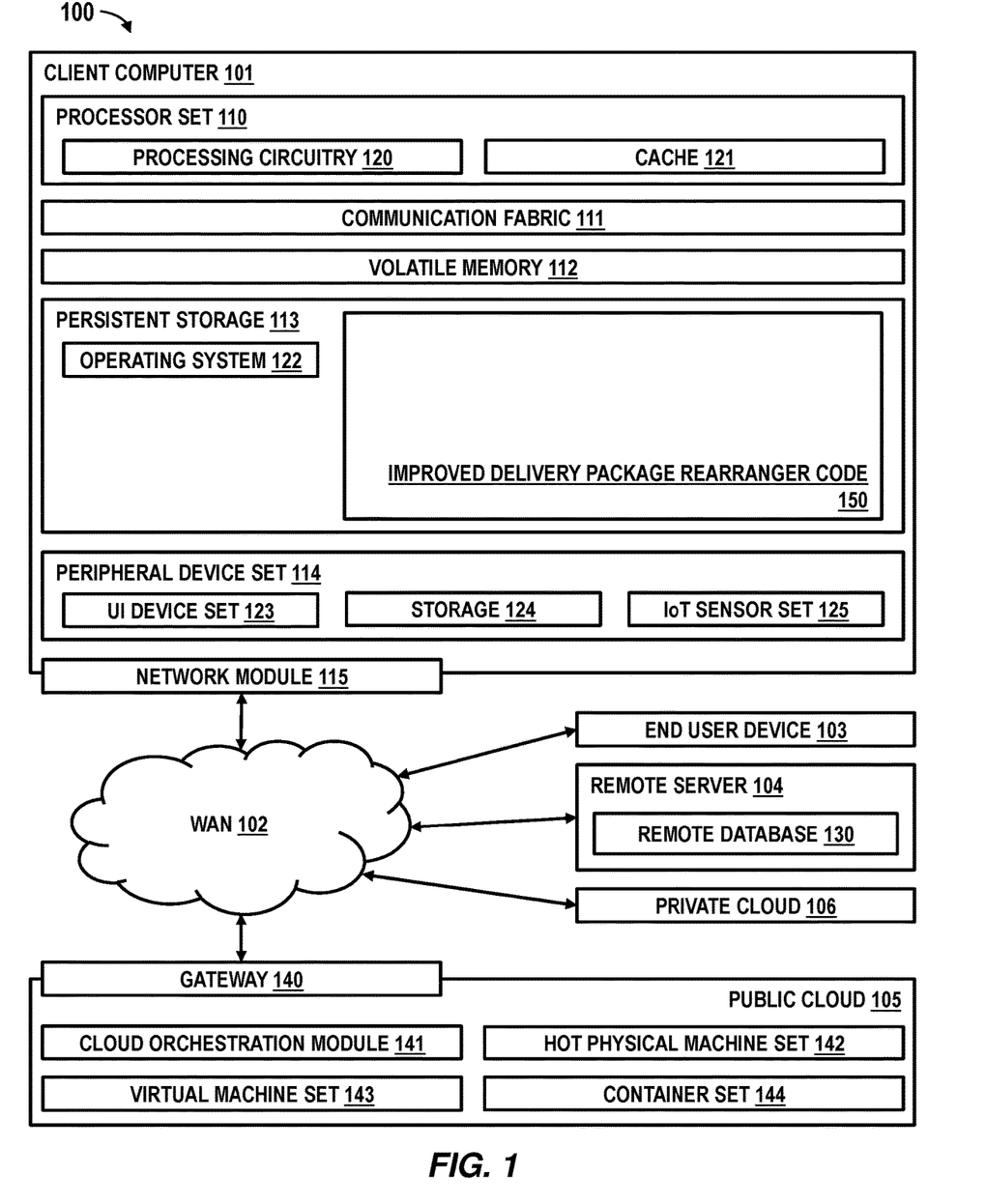
FIG. 1 depicts a diagram graphically illustrating the hardware components of delivery package rearranger environment 200 and a cloud computing environment, in accordance with an embodiment of the present invention.

FIG. 1 depicts a diagram graphically illustrating the hardware components of delivery package rearranger computing environment 100 and a cloud computing environment in accordance with an embodiment of the present invention.

Delivery package rearranger computing environment 100 contains an example of an environment for the execution of at least some of the computer code involved in performing the inventive methods, such as improved delivery package rearranger program code 150. In addition to the improved delivery package rearranger program code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and improved delivery package rearranger program code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in delivery package rearranger program code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface type operating systems that employ a kernel. The code included in improved electric vehicle charging scheduler program code 400 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
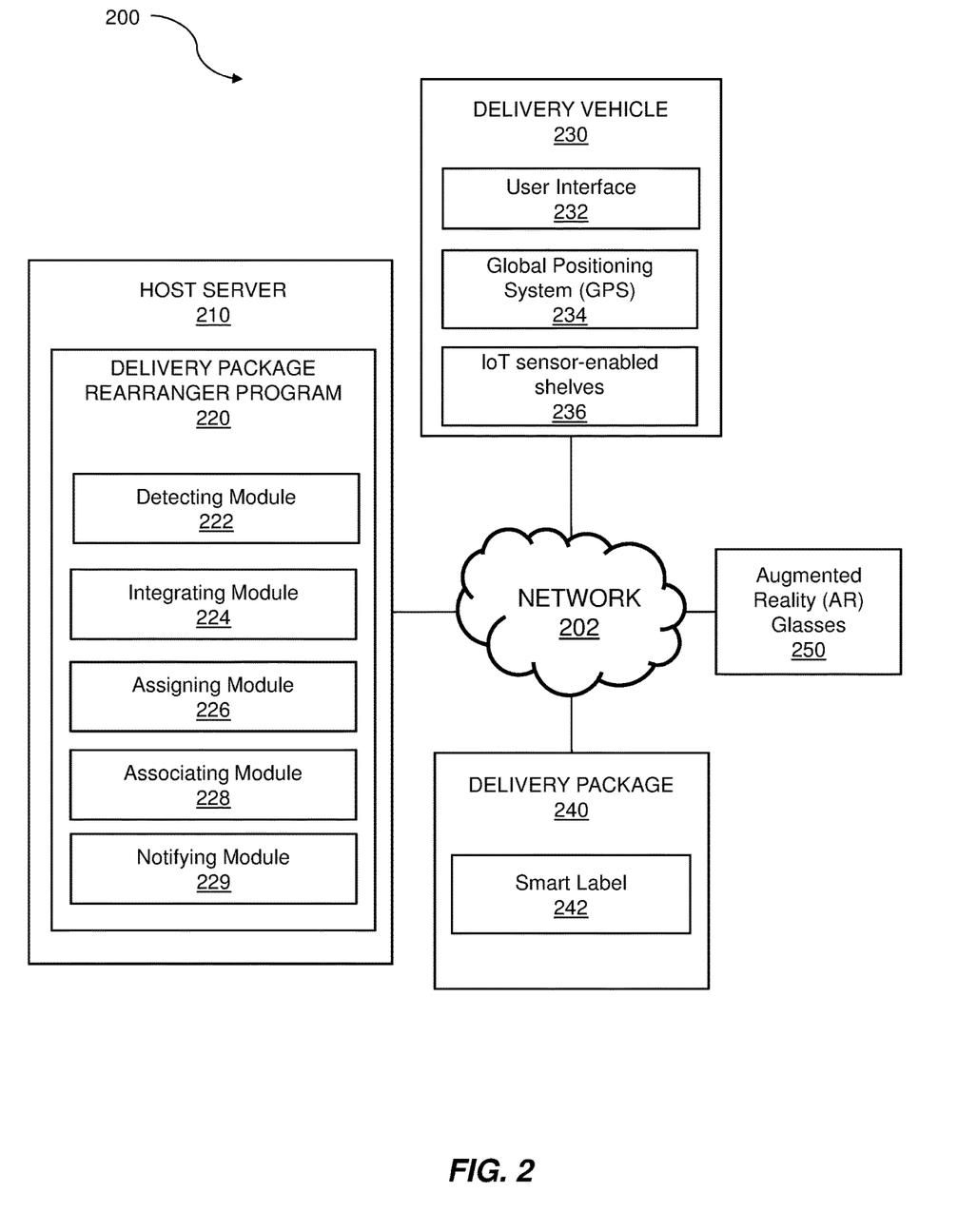
FIG. 2 illustrates delivery package rearranger environment 200, in accordance with an embodiment of the present invention.

FIG. 2 illustrates delivery package rearranger computing environment 200, in accordance with an embodiment of the present invention. Delivery package rearranger computing environment 200 includes host server 210, delivery vehicle 230, delivery package 240, and augmented reality (AR) glasses 250, all connected via network 202. The setup in FIG. 2 represents an example embodiment configuration for the present invention and is not limited to the depicted setup to derive benefit from the present invention.

In an exemplary embodiment, host server 210 includes delivery package rearranger program 220. In various embodiments, host server 210 may be a laptop computer, tablet computer, netbook computer, personal computer (PC), a desktop computer, a personal digital assistant (PDA), a smart phone, or any programmable electronic device capable of communicating with delivery vehicle 230, delivery package 240, and AR glasses 250, via network 202. Host server 210 may include internal and external hardware components, as depicted, and described in further detail with reference to FIG. 1. In other embodiments, host server 210 may be implemented in a cloud computing environment, as further described in relation to FIG. 1 herein. Host server 210 may also have wireless connectivity capabilities allowing it to communicate with delivery vehicle 230, delivery package 240, AR glasses 250, and other computers or servers over network 202.

With continued reference to FIG. 2, delivery vehicle 230 includes user interface 232, global positioning system (GPS) 234, and Internet of Things (IoT) sensor-enabled shelves 236. In exemplary embodiments, delivery vehicle may include, but is not limited to, a car, a minivan, a bus, a truck, a tractor-trailer, a train, or any road (or off-road) vehicle whose general purpose is the delivery of items, packages, goods, and merchandise.

In exemplary embodiments, user interface 232 is a computer program which allows a user to interact with delivery vehicle 230 and other connected devices via network 202. For example, user interface 232 may be a graphical user interface (GUI). In addition to comprising a computer program, user interface 232 may be connectively coupled to hardware components, such as those depicted in FIG. 1, for sending and receiving data. In an exemplary embodiment, user interface 232 may be a web browser, however in other embodiments user interface 232 may be a different program capable of receiving user interaction and communicating with other devices, such as host server 210, delivery vehicle 230, delivery package 240, and AR glasses 250.

In exemplary embodiments, user interface 232 may be presented on a touch screen display, a remote operated display, or a display that receives input from a physical keyboard or touchpad located within delivery vehicle 230, such as on the dashboard, console, etc. In alternative embodiments, user interface 232 may be operated via voice commands, Bluetooth® (Bluetooth and all Bluetooth-based trademarks and logos are trademarks or registered trademarks of Bluetooth SIG, Inc. and/or its affiliates), a mobile device that connects to delivery vehicle 230, or by any other means known to one of ordinary skill in the art. In exemplary embodiments, a user may interact with user interface 232 to transmit a message, wherein the message is in the form of audio data, video data, image data, text data, and so forth.

In exemplary embodiments, a user may view a driving map and/or a map of the stacked packages in the delivery vehicle 230 on user interface 232.

In various embodiments, a user may interact with user interface 232 to view/update/provide user feedback to delivery package rearranger program 220, via network 202.

In exemplary embodiments, GPS 234 is a computer program on delivery vehicle 230 that provides time and location information for delivery vehicle 230. Modern GPS systems operate on the concept of time and location. In modern GPS systems, four or more satellites broadcast a continuous signal detailing satellite identification information, time of transmission (TOT), and the precise location of the satellite at the time of transmission. When a GPS receiver picks up the signal, it determines the difference in time between the time of transmission (TOT) and the time of arrival (TOA). Based on the amount of time it took to receive the signals and the precise locations of the satellites when the signals were sent, GPS receivers can determine the location where the signals were received. In exemplary embodiments, GPS 234 can provide real-time location detection of delivery vehicle 230, together with an estimated time of arrival for a given destination based on real-time traffic, weather conditions, road construction, closed roads, and so forth. For example, GPS 234 may be capable of providing a set of longitudinal and latitudinal coordinates of delivery vehicle 230 in front of a destination address, such as a private home.

In exemplary embodiments, GPS 234 is found in delivery vehicle 230 and may include real-time information regarding traffic, emergency happenings on a route (i.e., car accident, bridge collapse, fire, road construction, etc.) or public events (i.e., sporting events, concerts) that may affect estimated travel time information. In exemplary embodiments, GPS 234 can provide alternate routes to reach a destination (e.g., delivery addresses along a pre-planned delivery route).

In exemplary embodiments, IoT sensor-enabled shelves 236 are rows of shelves, or racks, within delivery vehicle 230 that contain IoT sensors. The IoT sensors in the shelves, or racks, can communicate with the smart labels 242 on a delivery package 240 on a respective slot on the IoT sensor-enabled shelf 236.

In alternative embodiments, IoT sensor-enabled shelves 136 may include horizontal and vertical conveyer belts or a circular conveyer track, in the delivery vehicle 230, that circles around until the correct delivery package 240 appears front and center for the courier to take.

In exemplary embodiments, IoT sensors may include embedded computing systems that allow objects, such as delivery package 240, to be sensed or controlled remotely across existing network infrastructure, such as network 202, thus creating opportunities for more direct integration of the physical world into computer-based systems, and resulting in improved efficiency, accuracy, and economic benefit in addition to reduced human intervention.

In exemplary embodiments, IoT sensor-enabled shelves 236 may be a device, hardware component, module, or subsystem capable of recording, capturing, and detecting events or changes in a delivery package route and sending the detected data to other electronics (e.g., host server 210), components (e.g., GPS 234), or programs (e.g., delivery package rearranger program 220) within a system (e.g., delivery package rearranger computing environment 200). In various embodiments, the detected data collected by IoT sensor-enabled shelves 136 may be instrumental in providing a revised ordering sequence for delivery of one or more delivery packages 240 on a delivery route.

IoT sensors in the IoT sensor-enabled shelves 236, in exemplary embodiments, may be a software application, proximity sensor, camera, microphone, light sensor, infrared sensor, weight sensor, magnetic ring sensor, temperature sensor, tactile sensor, motion detector, optical character recognition (OCR) sensor, occupancy sensor, heat sensor, analog sensor (e.g., potentiometers, force-sensing resistors), radar, radio frequency sensor, quick response (QR) code, video camera, digital camera, lasers, gyroscopes, accelerometers, actuators, structured light systems, tracking sensors, and other devices used for measuring, detecting, recording an environment or current state of an object (e.g., delivery package 240).

In exemplary embodiments, IoT sensor-enabled shelves 136 are capable of continuously monitoring, collecting, and saving collected data on a local storage or storage on a separate server, or alternatively, sending the collected data or various selected pieces of the collected data to delivery package rearranger program 220.

With continued reference to FIG. 2, delivery package 240 may include a box (of various sizes), an envelope (of various sizes) or any other item that is typically sent/delivered via the postal service or via a private courier service (i.e., package delivery service provider). Some well-known courier services may provide delivery package 240 tracking services such as scanning a shipping label (i.e., smart label 242) and uploading the tracking information to a database, or server, that may be accessed by a sender/recipient entering a tracking number via a website or portal. Tracking information may include date and time that a delivery package 240 is received at various distribution centers, loaded/unloaded to a delivery vehicle (e.g., a truck, car, airplane), and so forth.

In exemplary embodiments, delivery package 240 contains smart label 242, which may be a barcode label or a Quick Response (QR) code. A QR code is a type of matrix barcode that contains data for a locator, identifier, or tracker that points to a website or application.

In exemplary embodiments, smart label 242 may be a symbol, or a machine-readable representation of data, which carries information about the delivery package 240. Barcode printing uses different combinations of bars and spaces to encode data into barcodes that are printed on a label or a card. Barcodes can be one-dimensional or two-dimensional, and they can be read by special optical scanners or barcode readers, such as a barcode scanner, desktop printers, and smart phones.

In further exemplary embodiments, smart label 242 contains unique information pertaining to a specific delivery package 240 such as a recipient's name, a delivery address that includes street name, city, state, and zip code, embedded GPS longitudinal and latitudinal coordinates for a delivery address, and delivery instructions (e.g., door code, where to leave delivery package 240, etc.). Smart label 242 may also contain additional data such as weight of delivery package 240, item description, tracking information, and so forth.

With continued reference to FIG. 2, augmented reality (AR) glasses 250, or smart glasses, are eye or head-worn wearable computers that offer useful capabilities to a user. May AR glasses, such as AR glasses 250, include displays that add information alongside or to what the user sees.

In exemplary embodiments, AR glasses 250 can superimpose information onto a field of view through an optical head-mounted display or embedded wireless glasses with transparent heads-up display or AR overlay. Like other computers, AR glasses 250 may collect information from internal or external sensors.

With continued reference to FIG. 2, host server 210 delivery package rearranger program 220. Host server 210 may be a laptop computer, tablet computer, netbook computer, personal computer (PC), a desktop computer, a personal digital assistant (PDA), a smart phone, or any programmable electronic device capable of communicating with delivery vehicle 230, delivery package 240, and AR glasses 250 via network 202.

With continued reference to FIG. 2, delivery package rearranger program 220, in an exemplary embodiment, may be a computer application on host server 210 that contains instruction sets, executable by a processor. The instruction sets may be described using a set of functional modules. In exemplary embodiments, delivery package rearranger program 220 may receive input from delivery vehicle 230, delivery package 240, and AR glasses 250 over network 202. In alternative embodiments, delivery package rearranger program 220 may be a computer application on delivery vehicle 230, or a standalone program on a separate electronic device.

With continued reference to FIG. 1, the functional modules of delivery package rearranger program 220 include detecting module 222, integrating module 224, assigning module 226, associating module 228, and notifying module 229.

Figure 3:
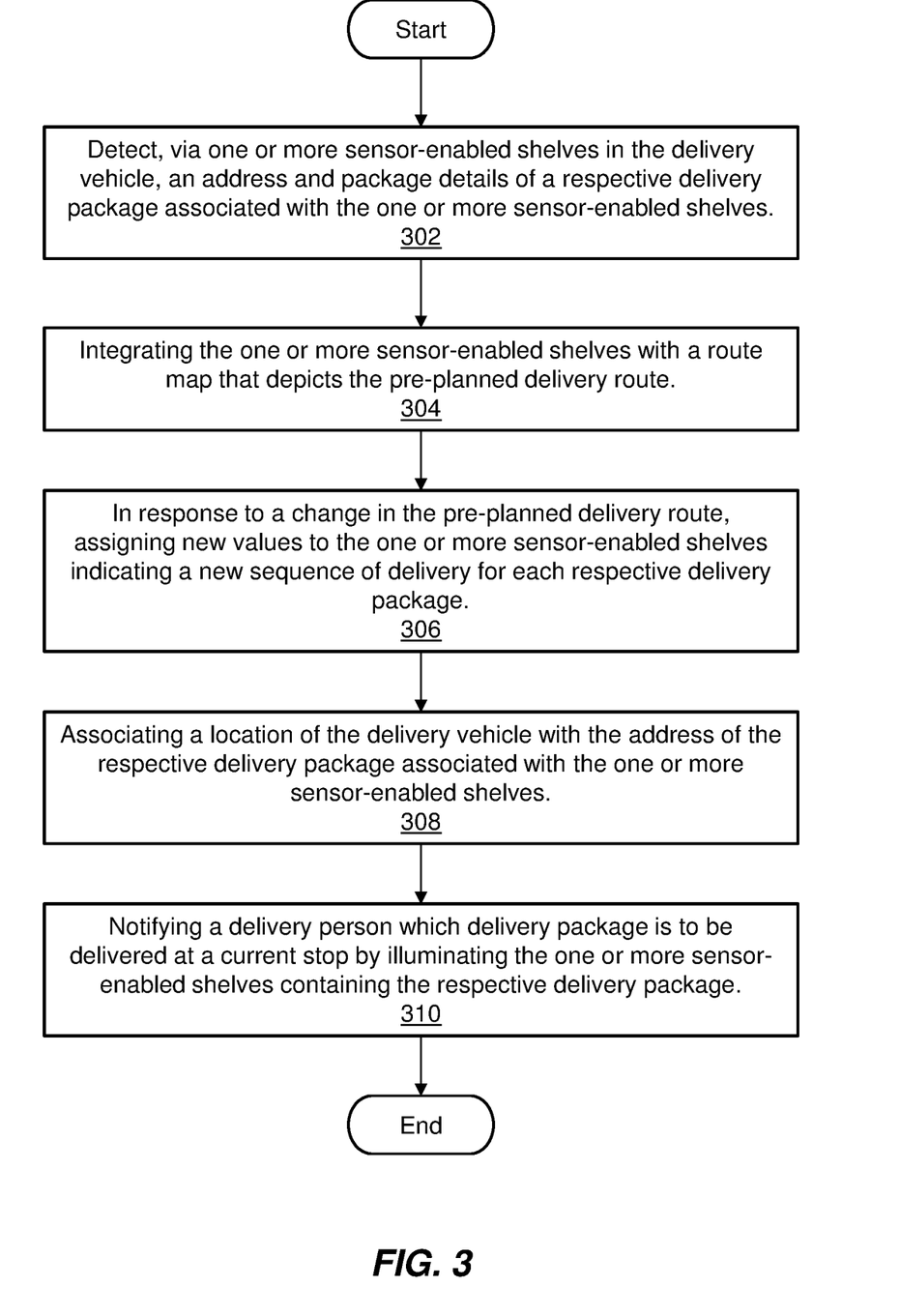
FIG. 3 is a flowchart illustrating the operation of delivery package rearranger program 220 of FIG. 2, in accordance with an embodiment of the present invention.

FIG. 3 is a flowchart illustrating the operation of delivery package rearranger program 220 of FIG. 2, in accordance with embodiments of the present disclosure.

With reference to FIGS. 2 and 3, detecting module 222 includes a set of programming instructions, in delivery package rearranger program 220, to detect, via one or more sensor-enabled shelves in the delivery vehicle, an address and package details of a respective delivery package associated with the one or more sensor-enabled shelves (step 302). The set of programming instructions is executable by a processor.

In exemplary embodiments, IoT sensor-enabled shelves 236 contain the details of the area/address for each respective delivery package 240.

In further exemplary embodiments, the IoT sensor-enabled shelves 236 may be individualized, and compartmentalized, shelves that each contain their own respective delivery package 240.

Figure 4A:
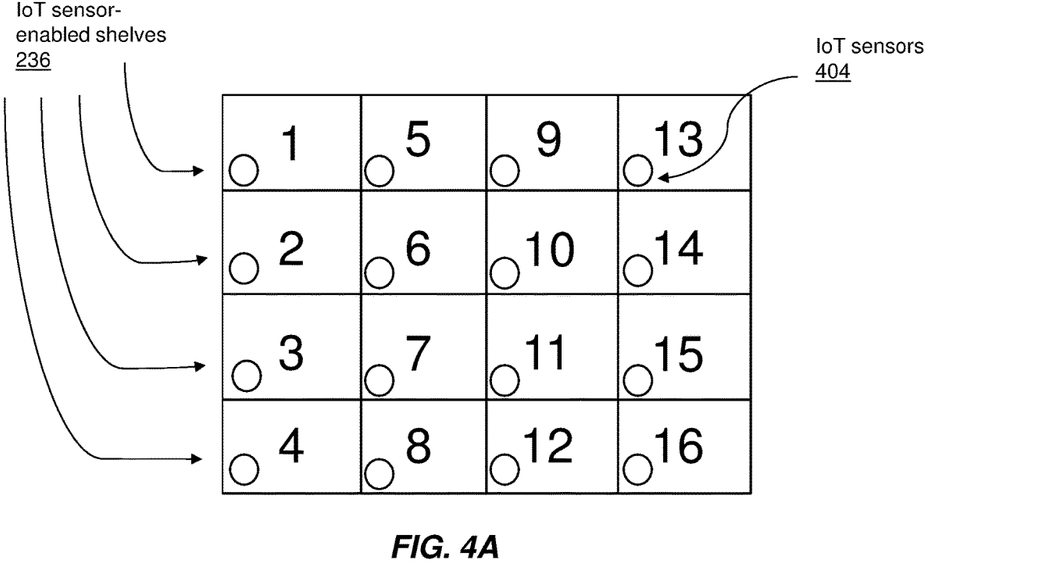
FIG. 4A denotes a pre-planned delivery route showing the shelves/racks in a numbered order for delivery in delivery vehicle 230, in accordance with embodiments of the present disclosure.

FIG. 4A denotes a pre-planned delivery route showing the shelves/racks in a numbered order for delivery in delivery vehicle 230, in accordance with embodiments of the present disclosure.

According to FIG. 4A, each delivery package (e.g., delivery package 240) is arranged in a way that the courier can easily retrieve the packages in the order they are stacked based on the planned delivery route. Each numbered square in FIG. 4A represents an individualized IoT sensor-enabled shelf 236. The small circles in each numbered square in FIG. 4A represent IoT sensors 404.

With continued reference to FIG. 4A, the delivery packages are arranged in ordered columns, according to their order in the delivery route. For example, squares 1-4 represent one stack of delivery packages in their own respective individualized IoT sensor-enabled shelves 136, at the beginning of the delivery route. Squares 5-8 represent another stack and so on.

Figure 4B:
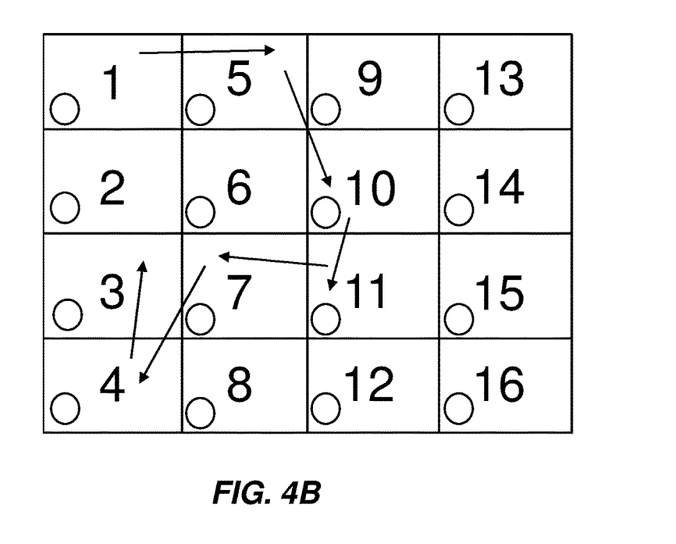
FIG. 4B denotes a changed delivery route showing the shelves/racks in a re-numbered order for delivery in delivery vehicle 230, in accordance with embodiments of the present disclosure.

FIG. 4B denotes a changed delivery route showing the IoT sensor-enabled shelves 136 in a re-numbered order for delivery in delivery vehicle 230, in accordance with embodiments of the present disclosure.

According to FIG. 4B, once there is a change in the planned delivery route, the IoT sensor-enabled shelves 136 are re-arranged in a new order based on the new delivery route and the associated address of the packages in the delivery vehicle 230.

For example, with continued reference to FIG. 4B, the IoT sensor-enabled shelves 136 are re-arranged from 1→2→3→4→5 etc. to 1→5→10→11→17 etc., reflecting the change in the delivery route and the new order of delivery for the stacked packages in delivery vehicle 230.

With reference to an illustrative example, Joe is a driver for a well-known package delivery service provider and has a truckload full of delivery packages 240. To better organize his delivery route, Joe arranges the delivery packages to be delivered in the beginning of his route towards the back door of the delivery truck, making them more accessible. Detecting module 222 knows the addresses of each individual package in the truck since each package is compartmentalized in individual IoT sensor-enabled shelves.

With continued reference to FIGS. 2 and 3, integrating module 224 includes a set of programming instructions in delivery package rearranger program 220, to integrate the one or more sensor-enabled shelves with a route map that depicts the pre-planned delivery route (step 304). The set of programming instructions is executable by a processor.

In exemplary embodiments, integrating module 224 connects the route map, or GPS 234 in delivery vehicle 230, to the IoT sensor-enabled shelves containing the delivery packages 240.

For example, delivery package rearranger program 220 generates a directed graph data structure that emulates the pre-planned delivery route, wherein each node of the graph data structure represents a delivery stop and is annotated with corresponding GPS coordinates and associated delivery package identifiers (IDs) to be delivered at the delivery stop, wherein the associated delivery package IDs include smart labels (e.g., smart label 242) and delivery instructions. Additionally, delivery package rearranger program 220 projects the delivery package in a three-dimensional (3D) AR image superimposed on a delivery address image (e.g., house, apartment, cabin, warehouse, etc.), further depicting an exact location at the delivery address where to leave the delivery package.

In exemplary embodiments, the smart labels 242 associated with the delivery package 240 ID comprise additional information related to the delivery package comprising address, weight, package dimensions, and delivery instructions.

With continued reference to the illustrative example above, the GPS and map information for the planned delivery route is directly linked with the delivery addresses and order for delivery of the packages in the delivery truck. As such, Joe simply needs to follow his pre-planned delivery route on his driving map, via user interface 232, to know the order of his stops and which packages are delivered at each stop.

With continued reference to FIGS. 2 and 3, assigning module 226 includes a set of programming instructions in delivery package rearranger program 220, to assign new values to the one or more sensor-enabled shelves, in response to a change in the pre-planned delivery route, indicating a new sequence of delivery for each respective delivery package (step 306). The set of programming instructions is executable by a processor.

With reference, again, to FIG. 4B, assigning module 226 assigns revised, or new, values to the individual IoT sensor-enabled shelves based on the driving route change indicating a revised order of the packages that need to be delivered from the delivery vehicle 230. The arrow lines indicate the revised order of the packages to be delivered in conjunction with the re-routed delivery route.

In exemplary embodiments, assigning module 226 synchronizes a delivery route recalculation, based on the change in the pre-planned delivery route, with the IoT sensor-enabled shelves 236 and GPS 234 beacons.

In exemplary embodiments, delivery package rearranger program 220 integrates the delivery route recalculation with AR glasses 250 and depicts a colored outline around the delivery package that is to be delivered at the current stop, when viewed through the AR glasses 250.

In alternative embodiments, the AR glasses 250 can scan the address on the smart label 242 of the delivery package 240 and suggest where in the delivery vehicle 230 it makes the most sense to place the delivery package, according to the pre-planned delivery route. Additional factors taken into consideration for package placement in the delivery vehicle 230 further include whether an individual is at home at the delivery address and whether an urgent delivery of a package is needed.

With continued reference to the illustrative example above, Joe encounters a traffic accident along his pre-planned delivery route and changes his route on the fly. The integrated map (e.g., GPS 234) with the re-routed delivery route connects to the IoT sensor-enabled shelves 236 and dynamically re-orders the numbers of the packages to be delivered. For example, the pre-planned delivery route had the delivery packages ordered as 1→2→3→4→5. The dynamically revised delivery route now has the delivery packages ordered as 1→5→10→11→17. In this fashion, it becomes easier for Joe to see the numbers glowing/vibrating on the racks in the delivery vehicle 230 and can easily be retrieved.

With continued reference to FIGS. 2 and 3, associating module 228 includes a set of programming instructions in delivery package rearranger program 220, to associate a location of the delivery vehicle with the address of the respective delivery package associated with the one or more sensor-enabled shelves (step 308). The set of programming instructions is executable by a processor.

In alternative embodiments, additional services may be provided using collected and real-time data regarding package delivery at a specific location. For example, generated AR can help a courier locate the exact place for a package to be delivered at the delivery address based on customer delivery instructions. Customer delivery instructions may be provided at the time of the order submission or in real-time with additional communication between the courier and the customer.

For example, the smart label 242 on delivery package 240 may include delivery instructions to place the delivery package 240 next to the front door at the delivery address. Delivery package rearranger program 220 can generate an AR image with a visual cue indicating the target placement of the delivery package 240.

With continued reference to the illustrative example above, Joe knows exactly which package to deliver at one of his stops along the delivery route because the address at the stop matches the address from the smart label 242 of a delivery package 240. Furthermore, Joe can identify, via an AR image of the delivery address looking through his AR glasses 250, a target placement for the package at the delivery address.

With continued reference to FIGS. 2 and 3, notifying module 229 includes a set of programming instructions in delivery package rearranger program 220, to notify a delivery person which delivery package is to be delivered at a current stop by illuminating the one or more sensor-enabled shelves containing the respective delivery package (step 310). The set of programming instructions is executable by a processor.

With continued reference to the illustrative example above, Joe's deliveries are more expedient once he arrives to a delivery address because he does not need to check the address on a delivery package label to see if he has the correct package for delivery. Rather, the individual IoT sensor-enabled shelf 236 is highlighted with the correct delivery package 240 to be delivered at a current stop.

In exemplary embodiments, network 202 is a communication channel capable of transferring data between connected devices and may be a telecommunications network used to facilitate telephone calls between two or more parties comprising a landline network, a wireless network, a closed network, a satellite network, or any combination thereof. In another embodiment, network 202 may be the Internet, representing a worldwide collection of networks and gateways to support communications between devices connected to the Internet. In this other embodiment, network 202 may include, for example, wired, wireless, or fiber optic connections which may be implemented as an intranet network, a local area network (LAN), a wide area network (WAN), or any combination thereof. In further embodiments, network 202 may be a Bluetooth network, a WiFi network, or a combination thereof. In general, network 202 can be any combination of connections and protocols that will support communications between host server 210, delivery vehicle 230, delivery package 240, and AR glasses 250.

The invention claimed is:

1. A method for dynamically rearranging one or more packages for delivery on a delivery vehicle, comprising:
   detecting, via one or more sensor-enabled shelves in the delivery vehicle, an address and package details of a respective delivery package associated with the one or more sensor-enabled shelves, wherein the one or more sensor-enabled shelves are numbered according to a pre-planned delivery route;
   integrating the one or more sensor-enabled shelves with a route map that depicts the pre-planned delivery route;
   in response to an unforeseen change in the pre-planned delivery route, dynamically re-numbering the one or more sensor-enabled shelves indicating a new number sequence of delivery for each respective delivery package;
   associating a location of the delivery vehicle with the address of the respective delivery package associated with the one or more sensor-enabled shelves; and
   notifying a delivery person which delivery package is to be delivered at a current stop by vibrating the one or more sensor-enabled shelves containing the respective delivery package.

2. The method of claim 1, further comprising:
   synchronizing a delivery route recalculation, based on the change in the pre-planned delivery route, with the one or more sensor-enabled shelves and global positioning system (GPS) beacons.

3. The method of claim 2, further comprising:
   integrating the delivery route recalculation with augmented reality (AR) glasses.

4. The method of claim 3, further comprising:
   depicting a colored outline around the delivery package that is to be delivered at the current stop, when viewed through the AR glasses.

5. The method of claim 1, further comprising:
   generating a directed graph data structure that emulates the pre-planned delivery route, wherein each node of the graph data structure represents a delivery stop and is annotated with corresponding GPS coordinates and associated delivery package identifiers (IDs) to be delivered at the delivery stop, wherein the associated delivery package IDs include smart labels and delivery instructions; and
   projecting the delivery package in a three-dimensional (3D) AR image superimposed on a delivery address image, further depicting an exact location at the delivery address where to leave the delivery package.

6. The method of claim 5, wherein the smart labels associated with the delivery package ID comprise additional information related to the delivery package comprising address, weight, package dimensions, and delivery instructions.

7. The method of claim 3, wherein the AR glasses scan the address on a smart label of the delivery package and suggests where in the delivery vehicle it makes most sense to place the delivery package, according to the pre-planned delivery route.

8. A computer program product, comprising a non-transitory tangible storage device having program code embodied therewith, the program code executable by a processor of a computer to perform a method, the method comprising:
  detecting, via one or more sensor-enabled shelves in the delivery vehicle, an address and package details of a respective delivery package associated with the one or more sensor-enabled shelves;
  integrating the one or more sensor-enabled shelves with a route map that depicts a pre-planned delivery route;
  in response to an unforeseen change in the pre-planned delivery route, assigning new values to the one or more sensor-enabled shelves indicating a new sequence of delivery for each respective delivery package, wherein the one or more sensor-enabled shelves are re-arranged in a new order based on the new sequence of delivery;
  associating a location of the delivery vehicle with the address of the respective delivery package associated with the one or more sensor-enabled shelves; and
  notifying a delivery person which delivery package is to be delivered at a current stop by vibrating the one or more sensor-enabled shelves containing the respective delivery package.

9. The computer program product of claim 8, further comprising:
  synchronizing a delivery route recalculation, based on the change in the pre-planned delivery route, with the one or more sensor-enabled shelves and global positioning system (GPS) beacons.

10. The computer program product of claim 9, further comprising:
  integrating the delivery route recalculation with augmented reality (AR) glasses.

11. The computer program product of claim 10, further comprising:
  depicting a colored outline around the delivery package that is to be delivered at the current stop, when viewed through the AR glasses.

12. The computer program product of claim 8, further comprising:
  generating a directed graph data structure that emulates the pre-planned delivery route, wherein each node of the graph data structure represents a delivery stop and is annotated with corresponding GPS coordinates and associated delivery package identifiers (IDs) to be delivered at the delivery stop, wherein the associated delivery package IDs include smart labels and delivery instructions; and
  projecting the delivery package in a three-dimensional (3D) AR image superimposed on a delivery address image, further depicting an exact location at the delivery address where to leave the delivery package.

13. The computer program product of claim 12, wherein the smart labels associated with the delivery package ID comprise additional information related to the delivery package comprising address, weight, package dimensions, and delivery instructions.

14. The computer program product of claim 10, wherein the AR glasses scan the address on a smart label of the delivery package and suggests where in the delivery vehicle it makes most sense to place the delivery package, according to the pre-planned delivery route.

15. A computer system, comprising:
  one or more computer devices each having one or more processors and one or more tangible storage devices; and
  a program embodied on at least one of the one or more storage devices, the program having a plurality of program instructions for execution by the one or more processors, the program instructions comprising instructions for:
    detecting, via one or more sensor-enabled shelves in the delivery vehicle, an address and package details of a respective delivery package associated with the one or more sensor-enabled shelves;
    integrating the one or more sensor-enabled shelves with a route map that depicts a pre-planned delivery route;
    in response to an unforeseen change in the pre-planned delivery route, assigning new values to the one or more sensor-enabled shelves indicating a new sequence of delivery for each respective delivery package, wherein the one or more sensor-enabled shelves are re-arranged in a new order based on the new sequence of delivery;
    associating a location of the delivery vehicle with the address of the respective delivery package associated with the one or more sensor-enabled shelves; and
    notifying a delivery person which delivery package is to be delivered at a current stop by vibrating the one or more sensor-enabled shelves containing the respective delivery package.

16. The computer system of claim 15, further comprising:
  synchronizing a delivery route recalculation, based on the change in the pre-planned delivery route, with the one or more sensor-enabled shelves and global positioning system (GPS) beacons.

17. The computer system of claim 16, further comprising:
  integrating the delivery route recalculation with augmented reality (AR) glasses.

18. The computer system of claim 17, further comprising:
  depicting a colored outline around the delivery package that is to be delivered at the current stop, when viewed through the AR glasses.

19. The computer system of claim 15, further comprising:
  generating a directed graph data structure that emulates the pre-planned delivery route, wherein each node of the graph data structure represents a delivery stop and is annotated with corresponding GPS coordinates and associated delivery package identifiers (IDs) to be delivered at the delivery stop, wherein the associated delivery package IDs include smart labels and delivery instructions; and
  projecting the delivery package in a three-dimensional (3D) AR image superimposed on a delivery address image, further depicting an exact location at the delivery address where to leave the delivery package.

20. The computer system of claim 19, wherein the smart labels associated with the delivery package ID comprise additional information related to the delivery package comprising address, weight, package dimensions, and delivery instructions.

* * * * *